(12) United States Patent
Lamouline (10) Patent No.: US 8,458,296 B2
(45) Date of Patent: Jun. 4, 2013

(54) COMPUTER SYSTEM WITH SIMPLIFIED SERVER ACCESS AND CORRESPONDING PROCESS

(75) Inventor: Thierry Lamouline, Tassin (FR)

(73) Assignee: Yooget, Lyons (FR)

( * ) Notice: Subject to any disclaimer, the term of this patent is extended or adjusted under 35 U.S.C. 154(b) by 78 days.

(21) Appl. No.: 12/290,839

(22) Filed: Nov. 4, 2008

(65) Prior Publication Data

US 2010/0057838 A1 Mar. 4, 2010

(30) Foreign Application Priority Data

Aug. 27, 2008 (FR) ...................................... 08 04726

(51) Int. Cl.
*G06F 15/173* (2006.01)
(52) U.S. Cl.
USPC ........................................................ 709/219
(58) Field of Classification Search
USPC .......................................... 709/219, 203, 223
See application file for complete search history.

(56) References Cited

U.S. PATENT DOCUMENTS

| | | | |
|---|---|---|---|
| 6,359,880 B1* | 3/2002 | Curry et al. ................... | 370/352 |
| 6,542,497 B1* | 4/2003 | Curry et al. ................... | 370/352 |
| 6,609,196 B1* | 8/2003 | Dickinson et al. ............ | 713/154 |
| 6,839,758 B2* | 1/2005 | Sørensen ....................... | 709/226 |
| 7,088,705 B2* | 8/2006 | Curry et al. ................... | 370/352 |
| 7,093,279 B2* | 8/2006 | Tretheway et al. ............ | 726/3 |
| 7,110,399 B2* | 9/2006 | Banerjee et al. .............. | 370/389 |
| 7,162,540 B2* | 1/2007 | Jasen et al. .................... | 709/242 |
| 7,162,738 B2* | 1/2007 | Dickinson et al. ............ | 726/14 |
| 7,395,255 B2* | 7/2008 | Li ................................. | 1/1 |
| 2003/0189546 A1 | 10/2003 | Lamouline | |

* cited by examiner

*Primary Examiner* — David Eng
(74) *Attorney, Agent, or Firm* — Meyertons, Hood, Kivlin, Kowert & Goetzel, P.C.; Eric B. Meyertons (57) ABSTRACT

A computer system includes a host environment for the server, equipped with a port for communicating over an extended network and a network server to which is assigned a first network address or URL pathway. The computer system includes server applications and an access manager capable of receiving a call expression from the port. A call expression is a request from a user that includes the first network address or URL pathway. The access manager includes a discriminator that can be activated to check whether a call expression comprises a second URL-type segment that is different from the first network address or URL pathway; and a shunting device which activates the discriminator when the call expression is received from a registered user and if the discriminator determines that a call expression contains a second URL-type segment different from the first network address or URL pathway the shunting device activates a predefined application that isolates or rewrites the second URL-type segment.

11 Claims, 6 Drawing Sheets

COMPUTER SYSTEM WITH SIMPLIFIED SERVER ACCESS AND CORRESPONDING PROCESS

BACKGROUND OF THE INVENTION

1. Field of the Invention

The invention relates to the field of data processing over extended networks.

2. Description of the Relevant Art

When connected to an extended network such as the Internet, computer terminals currently potentially have access to a virtually infinite amount of information, the organization of which is unclear. Applicants have already submitted various proposals in an attempt to make life easier for the user, particularly French Patent No. 2805359 and French Patent Application No 08 01417.

SUMMARY OF THE INVENTION

In one embodiment a computer system includes a host environment for a server. The computer system is equipped with a port for communicating over an extended network. Added to this is a network server to which is assigned a first network address or routing URL. This network server has server applications, optionally including a subscriber application capable of identifying a caller as a registered user. An access manager is provided which receives, from the port, a call expression (the user request, minus the equivalent of the IP address assigned to the port which forms its header). The access manager applies predefined rules to the call expression; if a rule is verified, it calls up a server application which is selected according to the call expression and the rule that it is verifying, for example to supply the user with what is currently known as a "web page".

The access manager may be provided with:
- a discriminator that can be activated to check whether a call expression that does not conform to the predefined rules is found to contain a URL-type segment, and then to intercept such a message, and
- a shunting device which is capable, in the event of a recognized expression such as a URL-type expression, of calling up a specific predefined application with the intercepted expression as its parameter.

The registered data linked to the user may include a user identifier or a pointer for access to any other data linked to the user, stored locally or even remotely.

According to a first embodiment, the predefined application may include the creation of a shortened call expression corresponding to the intercepted expression, recognized as being of the URL type, and the provision of an indirect network addressing service, for targeting the URL of said segment from this shortened call expression.

The server applications may include a subscriber application capable of identifying a caller as a registered user, while the specific predefined application may be called up in the presence of at least one registered data item linked to the user.

According to a second embodiment, the predefined application includes the creation of a send page, in the name of the user, of an email containing the URL of said segment.

According to a variant, the same computer system may include at least two network servers having different IP addresses and assigned to different predefined applications, for example those of the first and second embodiments, respectively.

Embodiments also provide a process for assistance with computer browsing over an extended network, the process including:
- a. sending a request from a user terminal over the extended network, including a destination URL followed by an expression including a second URL,
- b. in an extended network server, at the port which has the physical address corresponding to the destination address, receiving an expression to be processed,
- c. determining whether the expression to be processed contains a URL-type segment, and
- d. if the answer to step c. is in the affirmative, calling up a predefined application specific to the server with the URL-type segment as its parameter.

BRIEF DESCRIPTION OF THE DRAWINGS

Further features and advantages of the invention will become apparent from the description that follows and the attached drawings, wherein.

The drawings and description that follow essentially contain elements of a specific nature. They may serve not only to assist with the understanding of the present invention but may also contribute to its definition if appropriate.

DETAILED DESCRIPTION OF THE PREFERRED EMBODIMENTS

Figure 1:
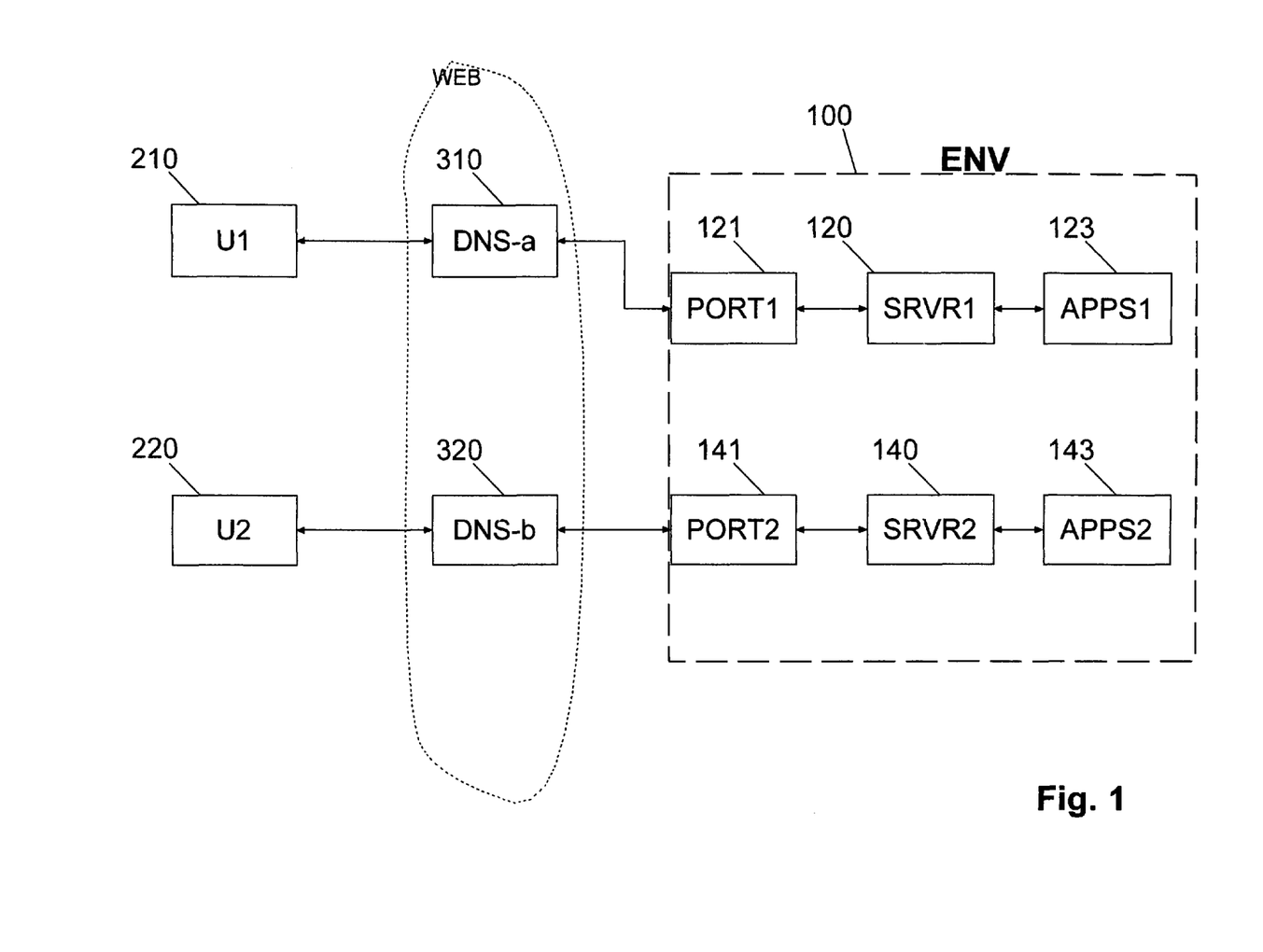
FIG. 1 is a block diagram of the basic computer structure to which the invention may be applied.

In FIG. 1, two user terminals 210 and 220 may be coupled to an extended network, in this case the Internet, to link up with the "web", for example. Also on the Internet is a server system 100, located on one or more intercommunicating machines. The machine(s) include(s) a host environment for servers as well as a port 121 for communicating with the extended network, an actual software server 120 and applications 123 accessible to the server.

In FIG. 1 and by way of example are shown, in the same environment 100, another server 140 equipped with its applications 143, having another port 141. Naturally, the applications 123 and 143 may be shared and may share the data that they use in a mass memory (not shown here).

The servers 120 and 140 are associated with two respective domain names. They are able to implement classic functions of an Internet site, such as displaying a web page as requested by the users U1 and U2 of the terminals 210 and 220.

It is also known that domain name servers (DNS) such as 310 and 320 are active on the Internet. These servers are tasked with converting a call for a site by a user into the physical Internet address (IP address) of the machine or machines that support the Internet site in question. Here, depending on the design, the terminal 210 accesses the domain name server 310, which provides it with the IP address of the port 121; for its part, the terminal 220 accesses the domain name server 320, which provides it with the IP address of the port 141. In practice, the IP address will often be obtained from the same DNS server.

Figure 2:
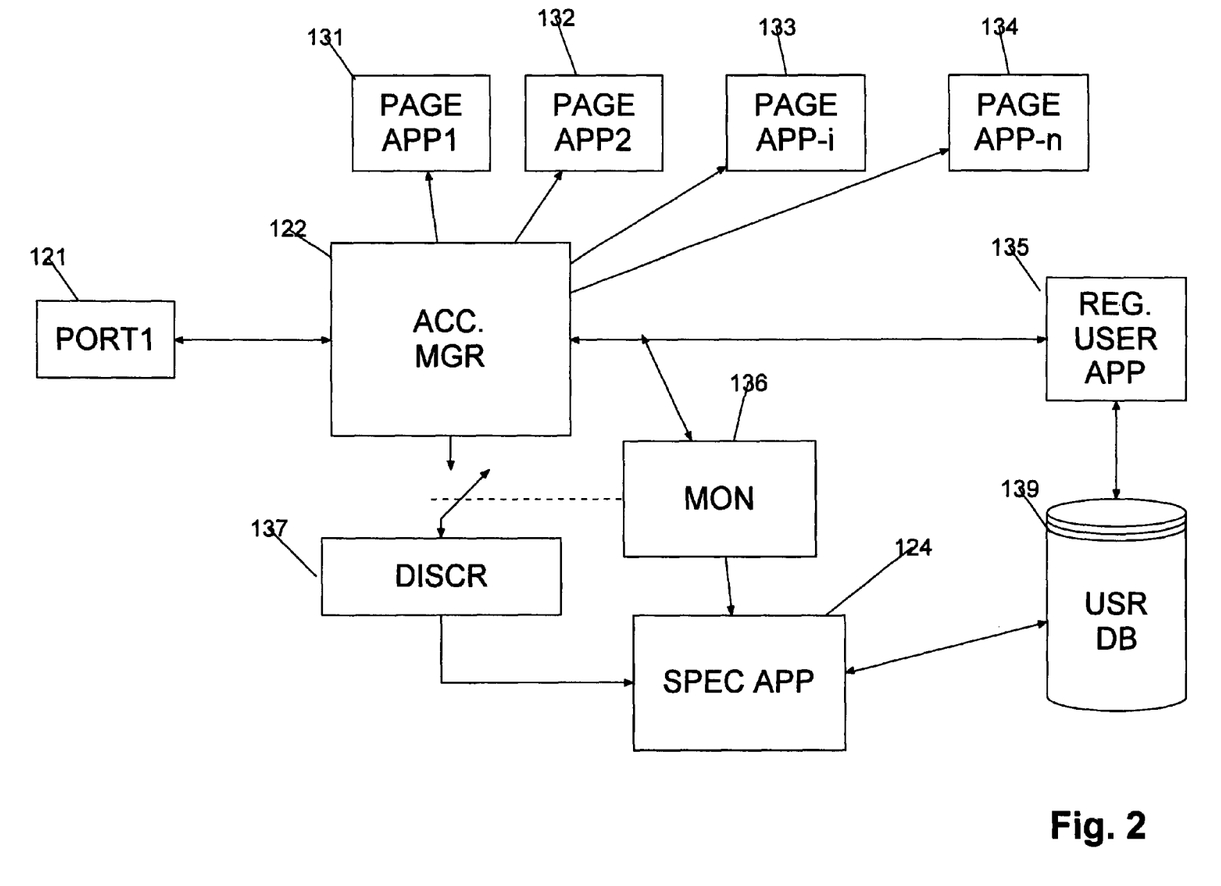
FIG. 2 is a detailed block diagram of an embodiment of the invention.

FIG. 2 shows the make-up of a server according to one embodiment.

The port 121 of FIG. 1 is shown. The server 120 includes, in particular, an access manager 122 which will receive a call expression from the port.

For example, if the call-up of the site by the user contains only the domain name, the access manager 122 will automatically select the home page, frequently called "/index.htm". This gives access to the tree of pages, from which the user can choose using the button, icon or other link provided on the homepage displayed on-screen (remote from the server). For example, FIG. 2 shows the "page applications" 131 to 134.

More generally, the access manager 122, which receives a call expression from the port, will apply predefined rules thereto. If a rule is verified, a server application, such as a web page, will be selected as a function of the call expression and the rule which it verifies.

The access manager 122 may include a rule that calls up, for the user, an on-line identification function, which is part of a set of subscriber management functions 135, also including a function for opening an account on the site. Thus, when a user connects to the site, he can identify himself. And in principle this identification remains valid for as long as the connection is maintained.

In short, the access manager 122 makes it possible to navigate around a tree, to call up pages or other links through the home page or an intermediate page. However, the remote user can also call up a page directly by inputting directly the corresponding call expression.

In other words, and more generally, the access manager gives access to different applications, whether it is a question of displaying a page, registering the user, setting up an account for them, or other functions. When a call expression arrives via the port 121 that does not correspond to anything known to the access manager, the latter refuses the call and sends an error message.

Certain embodiments disclosed herein work differently.

One embodiment provides a discriminator 137 which is capable of searching to see whether a call expression contains a URL-type segment. When a call expression does not correspond to any predefined rule in the access manager, the discriminator 137 analyses it, and intercepts it if it is of the URL type (also intercepting the error message).

A shunting device 136 is arranged so as to activate the discriminator in the presence of a call expression coming from a registered user.

In the particular embodiment shown in FIG. 2, the connection between the access generator 122 and the discriminator 137 includes a switch which is under the control of a shunting device or monitor 136. FIG. 2 also shows a link between the monitor 136 and the connecting line between the access manager 122 and the application 135 (registered users).

This illustrates the fact that the monitor 136 knows whether or not the current user has been identified, with the result that it can only operate the discriminator 137 in the presence of a registered user who has been identified for the current session.

If the discriminator recognizes a URL-type expression, then the monitor 136 proceeds to call up a specific application 124, with the URL-type segment as isolated or rewritten by the discriminator 137. To this is added, in principle, at least one registered data item linked to the user. This data item may simply be an identifier for the user in the user database 139.

The operation 400 corresponds to the sending of a request by a user U1. This request may be in the form shown on the right, opposite the element 400 in FIG. 4.

Figure 4:
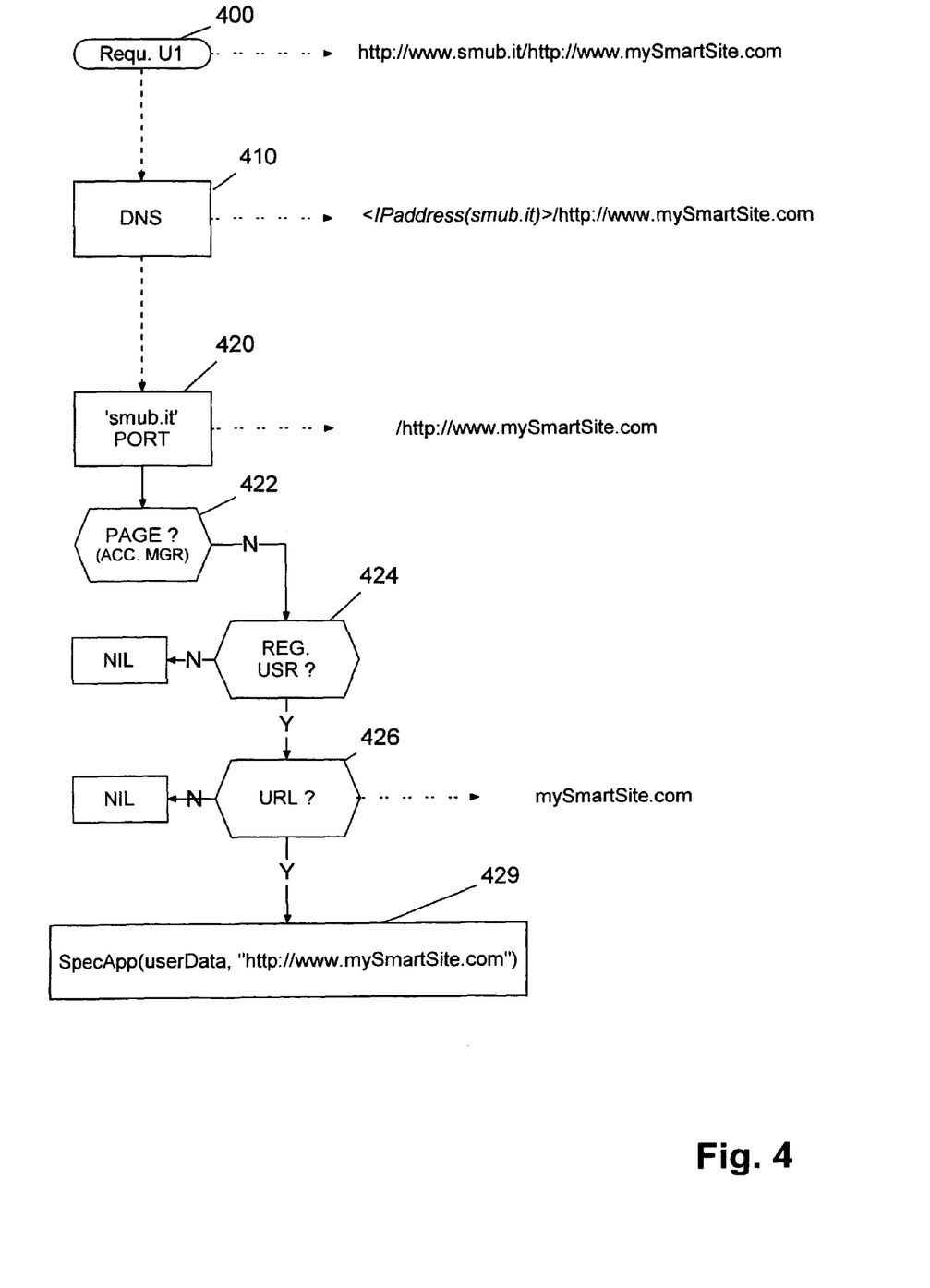
FIG. 4 is a flowchart illustrating generally the processes involved in an embodiment of the invention.

The request arrives at a domain name server 410, which proceeds to convert the preamble of the request into the physical address of the desired server.

It will be assumed here that the desired server is called "smub.it". Indeed, FIG. 4 shows the <IP address (smub.it)> as the physical address according to the Internet protocol which corresponds to the server whose current name is "smub.it".

At 420, the entry port of this "smub.it" server which has the physical address mentioned above receives, as a request, the remainder of the initial call expression, as shown on the right in FIG. 4.

At 422, this server proceeds first of all to check whether this corresponds to the address of a page that it supplies to ordinary visitors to the site. If this is not the case, the operation 424 seeks to find out whether the sender of the request at 400, namely the user U1, is a registered user who has already identified himself during this connection.

Next, the operation 427 seeks to find out whether what remains of the call expression corresponds to a URL (Uniform Resource Locator) and, if so, the operation 429 will launch a special operation the parameter of which is the remainder of the call expression opposite the element 427 in FIG. 4 (or opposite the element 420 in FIG. 4), as well as one or more user data, which can then be reduced simply to the user identification, the desired user data subsequently being collected by the specific application 124.

Some operations can be reversed in FIG. 4. For example, it is possible to check whether the user U1 has been identified before checking whether the call they are sending corresponds to a page, in operation 422.

Figure 3:
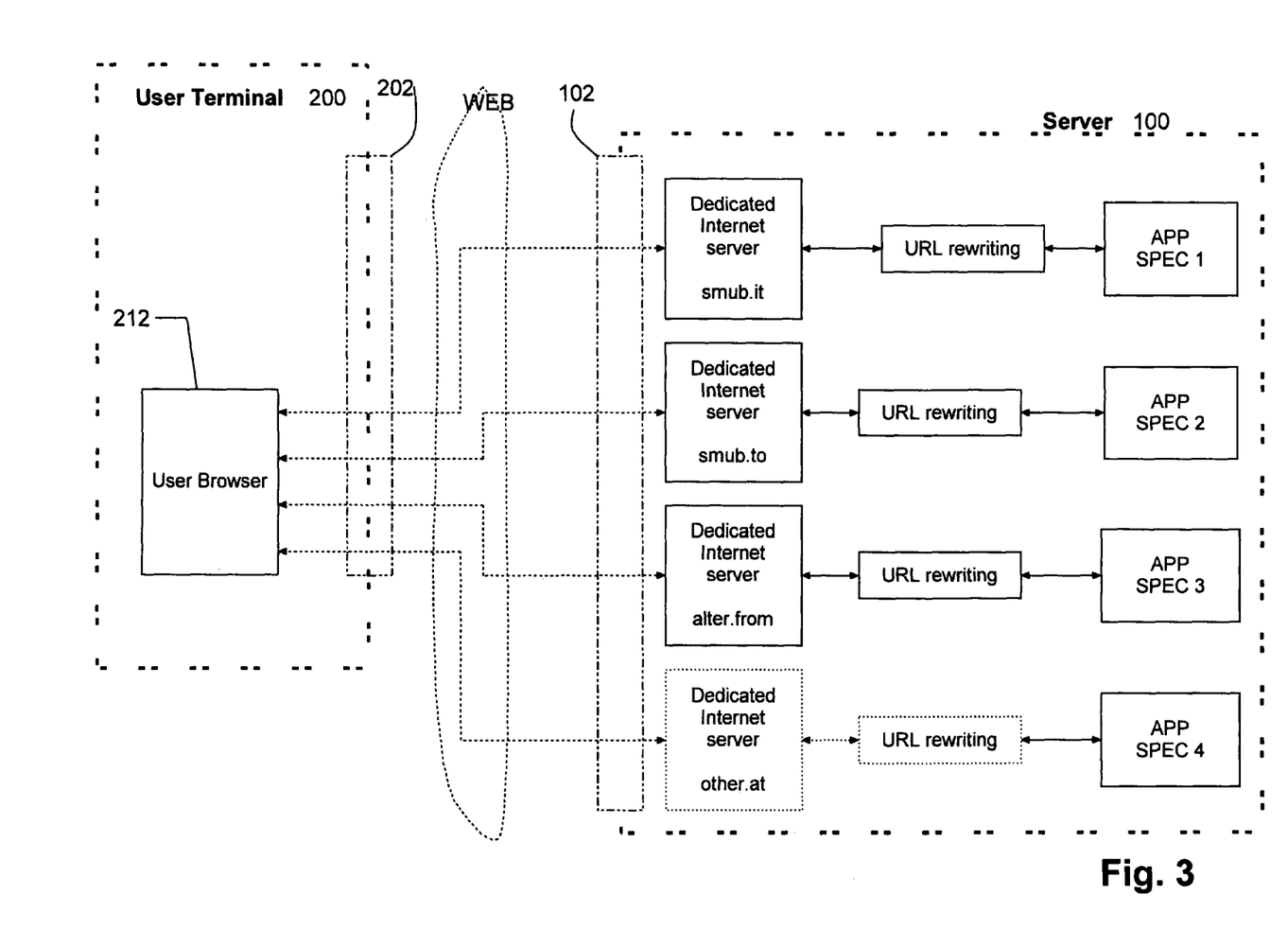
FIG. 3 is a block diagram of a configuration of an extended computer network that makes use of the invention.

Reference will now be made to FIG. 3, which will illustrate certain features of the embodiments.

Different Internet requests may start from the user's navigator 212, via the connection interface 202, and the web. In one or more server systems 100, a communication interface 102 is provided which gives access to a number of dedicated Internet servers, each one having a different URL. Here, one has:

server 120 with the URL "smub.it",
server 140 with the URL "smub.to",
server 150 with the URL "alter.from" (suffixes with more than two characters are currently being released),
server 150 with the URL "other.at".

In the manner described previously, each time that one of these servers is called up by an identified user with, after the URL, another URL or something resembling another URL according to a predetermined rule, the server in question (120, 140, 150, 160) will proceed to rewrite the call URL (for example at 122, 142, 152, 162), to then call up a specific application which is peculiar to this server (124, 144, 154, 164, respectively), having as its parameter at least this rewritten URL and preferably an identification of the user.

Two specific embodiments of the special applications 124 and 144 of FIG. 3 will now be described.

Figure 5:
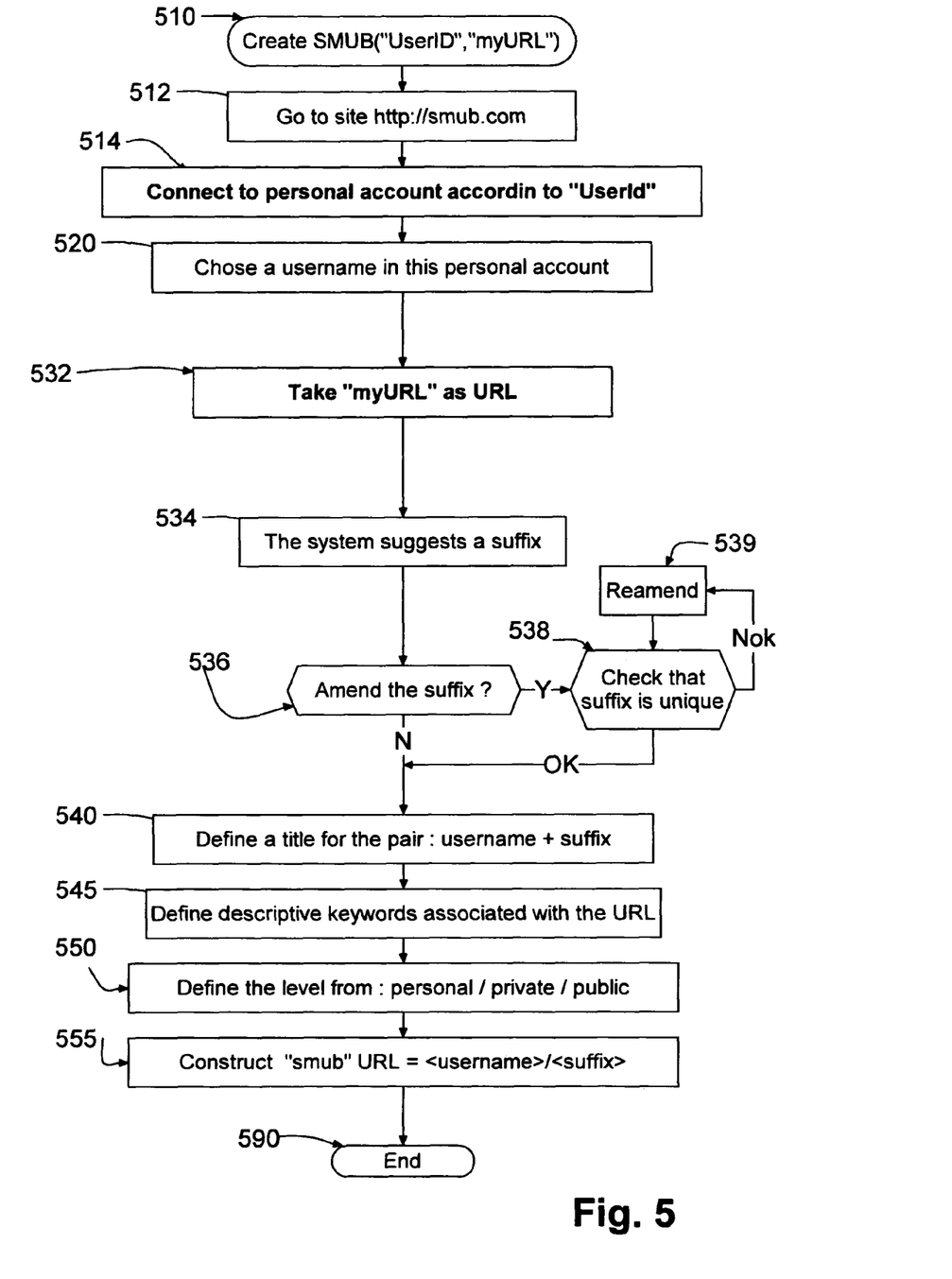
FIG. 5 is a flowchart illustrating a preferred application of the invention in more detail.

The special application 124 may correspond to a flowchart of FIG. 5.

This flowchart is taken from French Patent Application 0801417 dated 14 Mar. 2008 in the name of the Applicant. FIG. 5 of the present application corresponds precisely to that of the previous application, with the exception of the following points: FIG. 5 of the prior application speaks of "creating/modifying", whereas FIG. 5 of the present application speaks only of "creating"; the parts of FIG. 5 of the previous application corresponding to the "modifying" function have therefore been deleted. Subject to these amendments, the descriptive content of the previous application relating to FIG. 5 therein is to be regarded as being incorporated in the present description.

The operations added or modified in order to implement the embodiments are shown in bold in FIG. 5.

The new operation 514 reflects the fact that the user has already identified himself, and the application can therefore proceed to search for the personal account data in operation 514, according to the parameter "UserId", which here constitutes one of the parameters of the call 210 (in this case the first parameter).

The operation 520 of choosing a username for the personal account is optional in reality.

Next, in operation 532, instead of having to input a whole URL, which is often very complex, and is frequently the source of errors, and therefore being obliged to spend time and effort checking whether this URL actually exists, all that is needed in this operation 532 is to take the URL "myURL" which is passed here as the second parameter in the call 510, to form directly the URL which will be the subject of the shortcut according to the previous patent application.

The skilled man will appreciate that these operations are thus considerably simplified and stripped of a major source of errors.

The simplification will be better understood in the light of the following summaries:

The discussion relates to a user U1 who is connected to a site "myURL" that interests him.

This user is registered on the site "smub".

He is in a session during which he has identified himself.

Thus, all he has to do on the Internet address line (or URL) of his browser is to type:

"smub.it" before the URL that is found there.

With the present invention, all the rest is automatic, up to the operation 514 or 520 or 536 in FIG. 5, depending on the choices that will have been made in this flowchart in FIG. 5, regarding the operations that are optional or otherwise.

Obviously, the foregoing description is by no means restrictive by nature. Different servers may be provided with different specific applications, as shown in FIG. 3. A second specific application is defined in the flowchart in FIG. 6.

Figure 6:
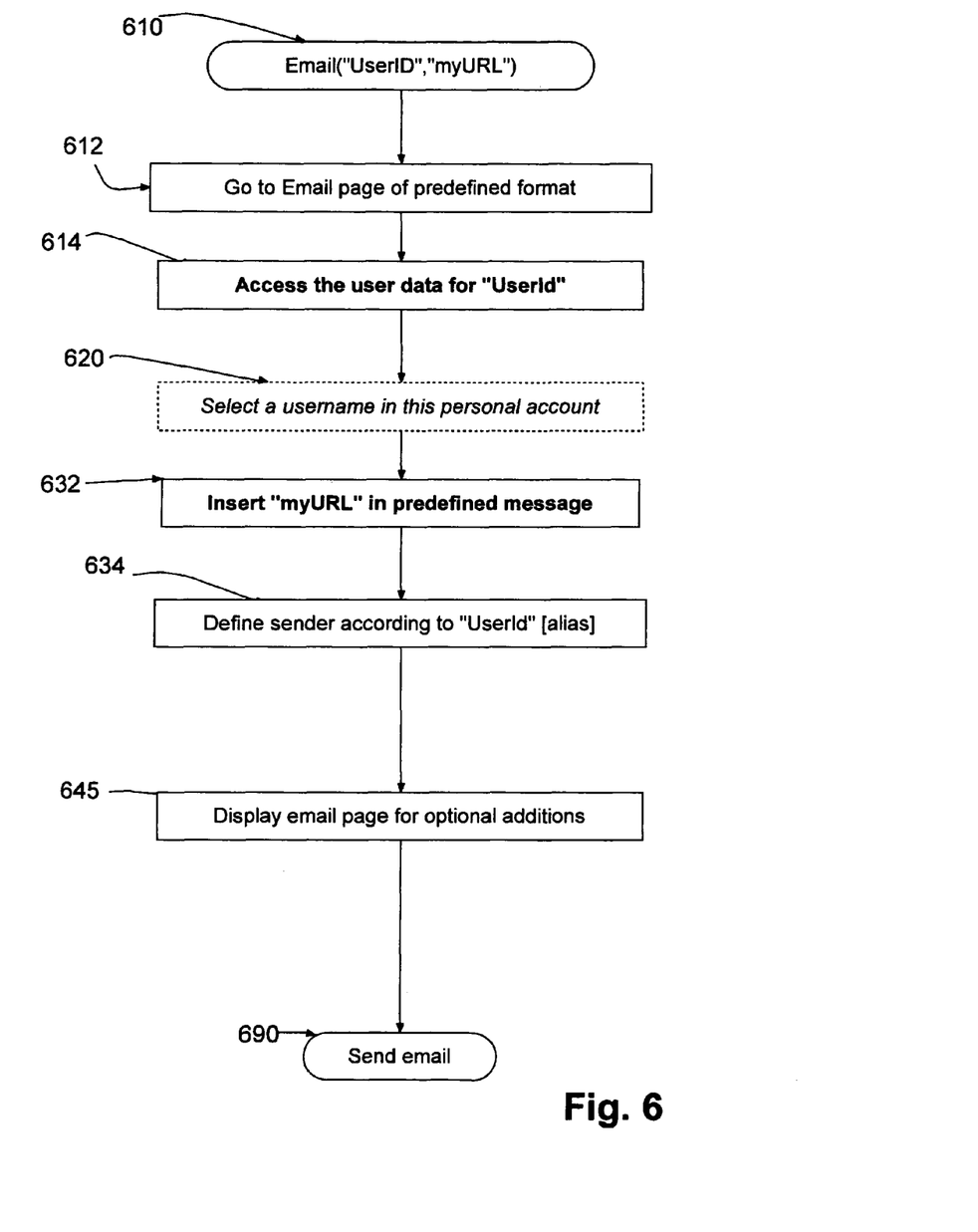
FIG. 6 is a flowchart illustrating another application of the invention in more detail.

In the entry operation 610, an email has to be sent with two parameters, the first of which is a user identifier while the second is the URL segment isolated at the exit from the block 137 in FIG. 2.

The operation 612 displays to the user an email page of a predefined format, wherein:

the operation 614 has given access to the user data corresponding to the identifier passed as parameter, and has allowed the email to be filled in with respect to these user data, according to a predefined format, or even, according to an alternative feature, in a format that may have been defined by the user himself.

optionally, the operation 620 allows the user to select a username corresponding to the user, in the manner of the usernames defined in the above-mentioned earlier patent application FR 0801417, for example.

the operation 632 inserts the URL passed as parameter in the predefined message.

the operation 634 defines the sender of the email, according to his user identifier or his username.

In this way the registered user is allowed to send a URL directly in an accompanying message to any of his contacts, simply by inputting "smub.to" (in the present instance) in front of the URL currently displayed in the address line of his browser.

Obviously, an operation 645 may be provided for displaying this email page and for adding any additional matter to it before sending it in operation 690.

A network addressing service 510 may use a multiplet of a predetermined format. The format may include an element linked to the registered user.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A server computer system which is assigned a first network address or URL pathway, comprising:
   a port for communicating over an extended network
   server applications running on the server computer system, wherein the server applications comprise:
      an access manager capable of receiving a call expression from the port, wherein a call expression comprises the first network address or URL pathway, wherein the access manager comprises:
      a discriminator that can be activated to check whether a call expression comprises a second URL-type segment that is different from the first network address or URL pathway; and
      a shunting device which activates the discriminator when the call expression is received from a registered user and
      wherein if the discriminator determines that a call expression contains a second URL-type segment different from the first network address or URL pathway the send the second URL-type segment to a specific application;
      wherein the specific application stores the second URL-type segment in a database wherein the second URL-type segment is associated with the user identification of the registered user.

2. The computer system according to claim 1, wherein the predefined application creates a shortened call expression comprising the second URL-type segment.

3. The computer system according to claim 1, wherein the server applications further comprise a predefined application that creates a send page for an email containing the second URL-type segment.

4. The computer system according to claim 1, further comprising at least one second network server to which is assigned a second routing URL, in that this second server comprises a second specific predefined application capable of creating an email send page, and in that this second network server also has an access manager, with a shunting device arranged to call up the second specific predefined application, with parameters comprising a URL-type segment of a second call expression that comprises the second routing URL and a second URL-type segment that is different from the second routing URL.

5. A process for assisting with computer browsing over an extended network, comprising:
   a. sending a request from a user terminal over the extended network the request comprising a destination URL followed by an expression,
   b. in an extended network server, at the port which has the physical address corresponding to the destination URL, receiving an expression of the request which is to be processed,
   c. determining whether the expression to be processed contains a URL-type segment, and
   d. if the expression contains a URL-type segment, calling up a specific predefined application of the server, with the URL-type segment of the expression as parameter.

6. The process according to claim 5, wherein the predefined application in step d. creates a shortened call expression comprising the URL-type segment.

7. The process according claim 5, wherein step d. further comprises determining that the request comes from a registered user, whereas the specific predefined application of the server is called if the request comes from a registered user.

8. The process according to claim 6, wherein the request is in the form of a multiplet of a predetermined format, this format having an element linked to the registered user.

9. The process according to claim 5, wherein the predefined application comprises creating a send page for an email containing the URL of said segment.

10. The process according to claim 9, wherein step d. further comprises determining that the request originates from a registered user, and wherein the predefined application creates a send page for an email containing the URL of said segment, in the name of the registered user.

11. The computer system according to claim 1, wherein the shunting device activates the discriminator when the call expression is received from a registered user.

* * * * *